United States Patent [19]
Green et al.

[11] 4,303,088
[45] Dec. 1, 1981

[54] PNEUMATIC VALVE AND REGULATOR ASSEMBLY

[75] Inventors: Charles J. Green, Vashon; Alan K. Forsythe, Burton, both of Wash.

[73] Assignee: Sprague Devices, Inc., Michigan City, Ind.

[21] Appl. No.: 46,268

[22] Filed: Jun. 7, 1979

[51] Int. Cl.³ .............................................. F16K 11/02
[52] U.S. Cl. ................................. 137/102; 137/116.3; 137/495
[58] Field of Search .................. 137/102, 116.3, 116.5, 137/495, 625.26, 596.2, 596

[56] References Cited

U.S. PATENT DOCUMENTS

| | | | |
|---|---|---|---|
| 2,663,393 | 12/1953 | Livermore | 137/116.3 UX |
| 2,741,263 | 4/1956 | Spencer | 137/116.3 X |
| 2,965,120 | 12/1960 | Snyder | 137/116.3 |
| 2,989,971 | 6/1961 | Valentine | 137/102 |
| 3,232,306 | 2/1966 | Miller | 137/116.5 |
| 3,269,157 | 8/1966 | Ashley | 137/102 X |

Primary Examiner—Alan Cohan
Attorney, Agent, or Firm—Oltsch, Knoblock & Hall

[57] ABSTRACT

A normally closed pneumatic valve and regulator assembly having regulator and vent valve spools is actuated by an operator pushbutton to automatically regulate pressure of a fluid provided from a pressure source. The valve assembly automatically vents when the pushbutton is released. A bias spring is operatively positioned between the pushbutton and one of the valve spools. The spring is preloaded by a pair of interlinked hook members which limits the travel of the pushbutton with respect to the valve spool and which maintains the spring in a preloaded condition so as to set a minimum value of regulated pressure. Fluid pressure from the pressure source urges the regulator valve spool into a normally closed position and the vent valve spool into an opened position. Pushing the pushbutton opens the regulator valve and closes the vent valve. The spring acts in opposition to fluid pressure on the combined valve spools to provide a regulated, reduced pressure for fluid exiting the valve. When the pushbutton is released, fluid pressure urges the valve spool into the normally closed position uncovering a vent hole to release pressurized fluid from the valve outlet.

7 Claims, 3 Drawing Figures

PNEUMATIC VALVE AND REGULATOR ASSEMBLY

BACKGROUND OF THE INVENTION

1. Field of the Invention

This invention relates in general to pneumatic regulator valve assemblies and, more particularly, to a valve and regulator assembly having an automatic pressure release vent means.

2. Description of the Prior Art

The valve assembly of this invention finds application in pneumatically powered devices such as, for example, commercial vehicle windshield washers and other vehicle appliances operated pneumatically. Pressurized fluid to operate such devices is provided by compressed air obtained, for example, from the air supply tank used to supply air to operate the brakes on a commercial vehicle. When operating pneumatically powered devices such as a windshield washer from such a source, it is desirable that the pressure driving such pneumatically powered devices be kept fairly constant in order to maintain a uniformly predictable operating performance. Prior art systems provide a separate pressure regulator to control the flow of fluid to a separate 3-way valve. The 3-way valve in one position connects the pressure regulator output to a pneumatically driven windshield and in another position vents the windshield washer. A certain type of pneumatically driven windshield washer pump has a flexible diaphragm contained within a housing with a washing solution contained by the housing on one side of the diaphragm. This type of pump is operated by having air pressure applied against the other side of the diaphragm to force the washing solution out of the pump housing. When the air pressure is released, a reservoir supplies washing solution to refill the pump. Consequently, it is desirable that the air pressure be automatically relieved to permit the pump to be refilled. Providing the various required functions with separate assemblies results in an undesirably costly, large, bulky apparatus, particularly when mounted behind a crowded truck dash where space is at a premium. A control device for operating truck accessory equipment such as windshield washer pumps and the like should be as compact and functionally efficient as possible.

SUMMARY OF THE INVENTION

It is therefore an object of this invention to provide an improved, pneumatic valve and preloaded regulator assembly for controlling pneumatically powered devices.

It is an object of this invention to provide a compact and functionally efficient valve and regulator assembly adapted to provide regulated air pressure for operating air-driven vehicle windshield washer pumps and the like.

It is also an object of this invention to provide a pushbutton-operated pneumatic valve assembly which automatically provides for venting of fluid pressure from the device being operated upon release of the pushbutton.

It is another object of this invention to provide a miniaturized pneumatic valve and regulator assembly which complactly provides a regulator and a vent valve spool assembly having reduced size and cost as well as improved performance.

In accordance with these and other objects of the invention, a normally-closed pneumatic valve assembly is provided which, when actuated by an operator, automatically regulates the pressure of a fluid delivered from a pressure source to a utilization device. The pneumatic valve assembly also provides for automatic venting of the utilization device when it is not actuated. The assembly includes a housing having a regulator valve chamber and a vent valve chamber having a vent, each chamber coupled to a utilization device. A regulator valve member is positioned within the regulator valve chamber and movable to an open position connecting the pressure source to the utilization device and regulating the pressure of fluid delivered to the utilization device. The regulator valve member is also movable to a closed position. A vent valve member is positioned within the relief valve chamber for contacting the regulator valve member for movement therewith. The vent valve member is movable to a first position blocking flow through the vent and to a second position permitting venting of pressurized fluid from the utilization device. An actuating means having a first actuated position and a second unactuated position is provided. A biasing means is also provided which exerts a preset biasing force between the actuating means and the valve members, such that when the actuating means is in the first actuated position, the regulator valve member is biased to regulate fluid pressure delivered to the utilization device, and the vent valve blocks the vent. When the actuating means is in the second unactuated position, the regulator valve is closed and the vent valve is in the vent position permitting the fluid to flow from the utilization device through the valve. According to another aspect of the invention, the biasing means includes an extendable linkage connected between the actuating means and the vent valve member which provides for limited movement therebetween and which has free movement between a first retracted position and a second extended position. In a further aspect of the invention, the biasing means includes a spring providing a preset biasing force for the biasing means. According to another aspect of the invention, the biasing means includes means for limiting the relative displacement of the actuator means with respect to the vent valve member. Another aspect of the invention includes the displacement limiting means having a pair of slidably interlinked L-shaped hook members extending respectively from the actuator member and the vent valve member movable support members. According to a further aspect of the invention the valve assembly includes a regulator valve chamber having a cylindrical bore wherein the regulator valve spool, or seal support member, has a plurality of raised portions providing a passage for fluid past said valve spool.

DESCRIPTION OF THE PREFERRED EMBODIMENT

Figure 1:
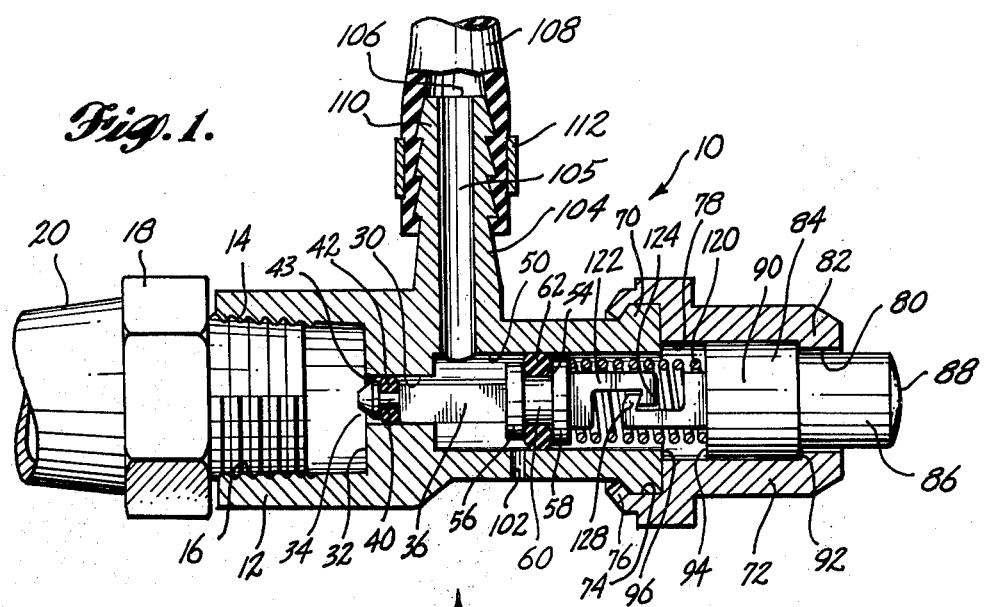
FIG. 1 of the drawings is a greatly enlarged, partial sectional view of an automatic valve assembly according to the invention showing the regulator valve assembly in a normally-closed position and showing the vent valve open.

Referring now to FIG. 1 of the drawings, a miniaturized, pushbutton-actuated pneumatic valve assembly 10 is shown which combines a gated pressure regulator valve and a vent valve according to the invention. A housing 12 has a series of adjacently positioned coaxial bores formed therein including a threaded bore 16 serving as an inlet and formed at one end thereof for receiving a threaded portion 14 of a pneumatic coupling 18 provided at the end of an air supply hose 20. The hose 20 provides pressurized air from a pressure source (not shown) which is, for example, the air brake pressure supply tank of a commercial vehicle.

A bore 30 having a shoulder 32 is formed at one end of the housing adjacent to and coaxial with the threaded bore 16. The bore 30 serves as a regulator valve chamber for a pressure regulator valve assembly 34. The pressure regulator valve assembly 34 includes a spool, or movable regulator valve member 36 a portion of the body thereof having, for example, a triangular cross section, the apexes, or raised portions, thereof slidably engaging the interior walls of the bore 30 to provide guidance and positioning of the spool 36 as well as to permit fluid to flow in the spaces between the sides of the triangular spool 36 and the interior of the bore 30. Alternative configurations of the spool 36 include having a plurality of raised portions for slidable engagement with the interiors of a corresponding bore through which the spool 36 passes and for permitting fluid flow past the spool 36. A variety of configurations are contemplated such as, for example, polygons, raised portions, grooved members, and the like. Contained within a cylindrically undercut portion, or retaining groove, 40 near the far end of the spool 36 is an O-ring valve seal, or sealing ring, 42 which serves as the slidable sealing means within bore 30, or regulator valve chamber. The spool 36 serves as a support member for supporting the valve seal.

Another bore 50 which serves as a vent valve chamber is formed in the housing 12 coaxial with and adjacent to the regulator valve chamber bore 30. A vent valve assembly includes a spool, or movable vent valve member, 60. The spool 60 has a cylindrically undercut portion, or retaining groove, 54 formed between a front shoulder 56 and a rear shoulder 56 of the valve spool 60 for containing an O-ring valve seal, or sealing ring, 62 which provides slidable sealing between the interior of the bore 50 and the spool 60. The end of the spool 36 abuts and contacts a face of the front shoulder 56 of the valve spool 60. The valve spools 36, 60 both serve as support members for supporting their respective valve seals.

The housing 12 has a projecting rim 70 formed at the end opposite the inlet hose coupling 18. A cap 72 is fastened to the housing rim 70 by a rolled lip portion 76 of the cap. The cap 72 has a first interior bore 78 for guiding and containing a pushbutton. The bore 78 is coaxially aligned with the bore 50 of the vent valve assembly 52 and is slightly larger in diameter than the bore 50. Another bore 80 having a diameter somewhat smaller than the first interior bore 78 of the cap is formed in the end of the cap 72 and includes a lip 82 in the end of the cap for retaining an actuating means including a valve actuator, or pushbutton, assembly 84.

Other forms of actuating means are usable as well known in the art. The pushbutton 84 has an operator finger-actuated portion 88 formed at the end thereof. A somewhat larger diameter cylindrical base portion 90 of the pushbutton 84 forms a shoulder with the finger-actuated portion 88 and is contained within the bore 78. The interior surface 92 of the lip 82 of the cap 72 serves as an outer stop for the shoulder of the pushbutton 84. An end 96 of the housing 12 serves as an inner stop for the innermost end 94 of the pushbutton 84. The axial movement of the pushbutton 84 is thus limited between an inner and an outer stop position. The bores 30, 50, 78 which respectively form the regulator valve chamber, the vent valve chamber, and the pushbutton guide bore in the particular embodiment described are all coaxially positioned along a common axis extending through the housing 12.

Extending outwardly from the bore 50 and through the side wall of the housing 12 is a vent aperture 102 through which pressurized air is vented from the bore 50 to the atmosphere. An outwardly projecting portion 104 of the housing has a central bore 105 therein which communicates with the vent chamber bore 50 of housing 12 providing a valve outlet 106 which is coupled to a utilization device (not shown), for example, a pneumatically driven windshield washer pump. Connection is made to the utilization device, for example, by means of a section of rubber tubing 108 which slips over the outer barbed surface of a barbed fitting portion 110, the barbs thereon providing for easy insertion of the rubber tubing 108 onto the fitting 110 and tending to prevent removal of the rubber tubing therefrom. The rubber tubing 108 may be further fastened and compression-sealed to the projecting portion 104 with a compression band 112, as well known in the art. The regulator valve chamber and the vent valve chamber each are connected to the utilization device through the valve outlet 106.

Figure 3:
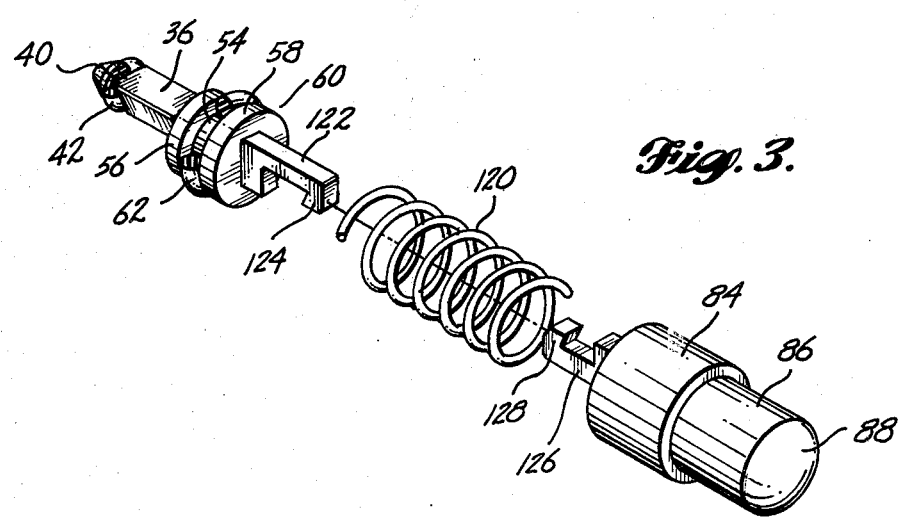
FIG. 3 of the drawings shows in more detail an enlarged exploded, perspective view of a regulator valve spool and a vent valve spool, a pushbutton, a biasing spring, and a preloading and travel limiting means according to the invention.

The valve spool 60 is resiliently linked to the pushbutton assembly 84 by a biasing means shown in exploded fashion in FIG. 3 of the drawings. The biasing means includes a coil spring 120 having a preselected spring constant and when assembled as described hereinbelow provides a predetermined initial biasing force between the pushbutton 84 and the valve spool 60. Extending axially from the spool 60 of the venting valve assembly 52 is one part of an extendable linkage formed by a projecting interlinking L-shaped hook member 122 having a downwardly extending hooked portion 124 at the outward end thereof. The pushbutton assembly 84 similarly has an axially extending interlinking L-shaped hook member 126 with a complimentary hooked portion 128 at the end thereof for engagement with the other hooked portion 124. The inner surfaces of the projecting hook portions are tilted slightly inwardly at an acute angle to facilitate hooking. When assembled with the interlinked L-shaped hook members, the spring 120 coaxially surrounds the overlapping hook members. The hook members 124, 128 form a compressable linkage and each hook moves axially with respect to the other as the spring 120 is compressed until the outer surfaces of the hook members 124, 128 are stopped by the surfaces opposite the hooked ends, thus limiting the axial movement or displacement of the pushbutton and valve spool combination. When the hook members 124 and 128 and spring 120 are assembled, the spring 120 is compressed to a preloaded condition so that the hook members 122, 126 and the spring 120 combination serve as a biasing means for exerting a preset biasing force between the pushbutton, or actuating means, assembly and the valve spool 60. The spring 120 thereby provides a predetermined bias force to the displacement limiting means formed with the interlinked L-shaped hook members. As will be explained hereinbelow the spring force is opposed by forces provided by fluid from the pressure source. It will be appreciated that the assembly of the spring 120 and the L-shaped hook members 124, 128 provides a means for limiting the relative displacement of the actuator means, or member 84, with respect to the valve spool 60.

FIG. 1 of the drawings shows the pneumatic valve assembly 10 according to the invention in its normally-closed, unactuated position. In this position the regulator valve spool 36 is positioned such that the O-ring 42 is positioned within the bore 30 and prevents fluid communication from the source to the outlet 106. In this position, the vent aperture 102 is connected to the outlet 106 providing a vent for the valve outlet 106. As described hereinabove, the spring 120 biases the spool 60 away from the pushbutton 84 and the interlinked hook members 124 and 128 limit the separation and relative axial movement of the spool 60 and the pushbutton. Pressure exerted by the pressure source against the effective surface area of the pressure regulator valve assembly 34 urges the pushbutton into the outwardly extended position as shown in FIG. 1 of the drawing. When the pushbutton 84 is in the unactuated, or release, position, the valve outlet 106 is automatically vented due to the position of the vent valve sealing ring with respect to the vent aperture 102 as shown in FIG. 1 of the drawing. The end of the regulator valve spool 36 is shown abutting the face of shoulder 56 of the vent valve spool 60. In some applications, it may be found desirable to disconnect the two valve spools at the point of abutment and provide suitable means for retaining the regulator valve spool 36 within the bore 30.

Figure 2:
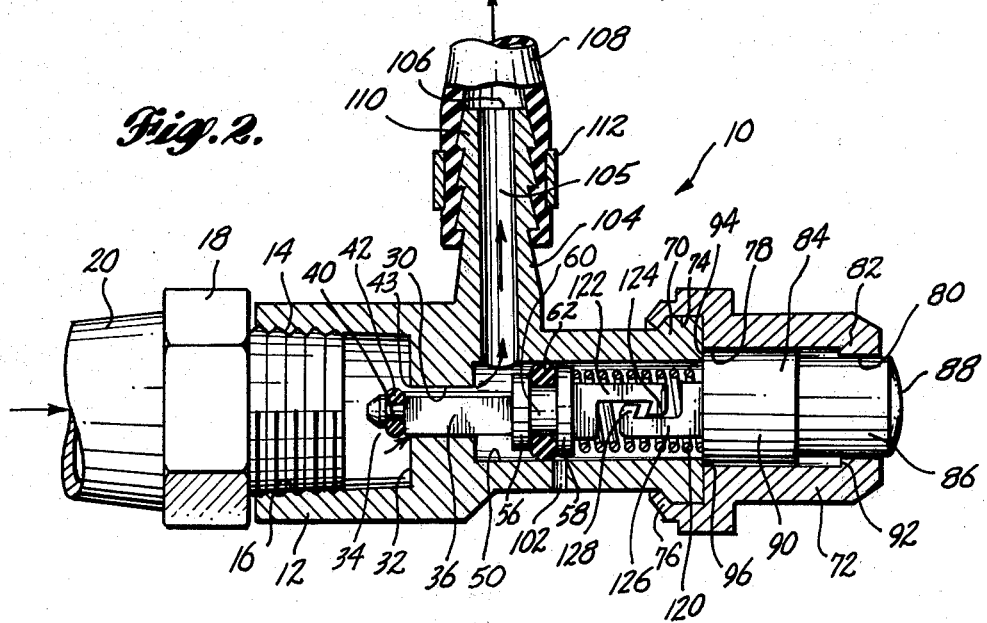
FIG. 2 of the drawings is also a greatly enlarged view of the assembly shown in FIG. 1 of the drawings which shows the regulator valve assembly in an actuated regulating position and showing the vent valve closed.

Referring now to FIG. 2 of the drawings, a pneumatic valve assembly 10 according to the invention is shown in an actuated position obtained when the pushbutton 84 is held in a depressed, or inward, position by an operator. When the pushbutton is actuated, the vent valve is closed because the sealing ring 62 is positioned beyond the vent aperture 102. The spring 120 resiliently biases the connected valve spool assembly so as to open the pressure regulator valve 34, permitting fluid to flow from the pressure source through the regulator valve chamber bore 30, into the vent valve chamber bore 50, and then to the outlet 106. The preset force developed by the spring 120 is counteracted by a force produced by pressure from the pressure source acting against the effective surface of regulator valve assembly 34 and the pressure within the bore 50 acting on the effective surface area of the vent valve assembly 52. The regulator valve assembly 34 provides regulation of fluid pressure therethrough by the relative positioning of the O-ring 42 with respect to the valve opening formed between the annular corner 43 of the shoulder 32 and the O-ring 42. Fluid pressure is regulated by a balancing of the spring force with the valve pressure forces such that the valve assembly 34, carrying O-ring 42 moves with respect to the edge 43 of the shoulder 32 to vary the valve opening thereby maintaining a somewhat constant reduced output pressure. In operation, the hook members 124, 128 are axially spaced apart by the spring and fluid pressure forces and move axially with respect to each other. A minimum value of regulated pressure is obtained by compressably preloading the spring 120 between the valve spools and the pushbutton assembly using the interlinking hooks. The spring 30 is selected to maintain fluid pressure in the outlet 106 at a nominal operating gauge pressure of, for example, 30 pounds per square inch, although the pressure of the fluid source may be much higher. Thus, the pushbutton 84 not only actuates fluid flow to the outlet 106 but also enables the pressure regulator valve assembly to automatically maintain a regulated relatively constant lower pressure in the outlet 106. The sum total of the fluid pressure forces acting on the valves is offset and balanced by the spring 120 force to maintain the output pressure at somewhat constant value. The effective surface area of the valves and the spring force may be varied to produce a different value of regulated output pressure, as required for a particular application. In addition to providing a minimum regulating pressure, it will be appreciated that preloading the valve spring 120 reduces the travel required by the pushbutton to activate the valve and provides for a compact valve and regulator assembly. As described above when the pushbutton 84 is depressed to the actuated position, the regulator valve automatically begins to regulate outlet pressure of fluid flowing through the valve in the direction of the flow lines shown in FIG. 2. When the pushbutton is released, the valve is automatically vented.

While this invention has been described with particular reference to a preferred embodiment it should be understood that various modifications may be made to the invention described herein without departing from the scope of the invention.

We claim:

1. A normally-closed gas valve and pressure regulator assembly which is actuated to open and to automatically provide regulated pressure for fluid obtained from a pressure source and delivered to a utilization device and which when not actuated provides connection of the utilization device to a vent, the assembly comprising:

a valve housing having an axis along which a series of bores are formed, the housing having an inlet bore formed along the axis and adapted to be connected to the pressure source, a regulator valve bore formed along the axis adjacent to the inlet bore with a diameter smaller than the inlet bore, a vent bore formed along the axis adjacent to the regulator valve bore, and an outlet and a vent aperture opening through said housing from said vent valve bore;

a pressure regulator valve shiftable axially in said regulator valve bore;

a vent valve shiftable axially in said vent valve bore;

means to apply axially directed force from a manually actuable member to said regulator valve and vent valve through a resiliently biased limiting lost motion link, said link including a pair of interlinked members axially extending respectively from the vent valve and from said manually actuable member, each of the interlinked members being surrounded by a spring exerting forces thereon to extend the link and having means to limit travel therebetween;

said pressure regulator valve being urged toward its closed position and said vent opened by pneumatic pressure in said inlet when said manually actuable member is inoperative;

said vent valve closing said vent and opening said pressure regulator valve upon operation of said manually actuable member, the increased pneumatic pressure in said vent valve bore directed against said vent valve together with pneumatic forces against said pressure regulator valve counterbalancing the axial forces applied to said regulator valve by said spring whereby fluid flow through said regulator valve is regulated to a predetermined pressure.

2. A gas valve and regulator assembly comprising:
a housing having an inlet, an outlet, a regulator valve chamber between said inlet and outlet, and a vent valve chamber communicating with said outlet and having a vent opening,
a pressure regulator valve shiftable in said regulator valve chamber,
a vent valve shiftable in said vent valve chamber between positions for respectively opening and sealing said vent opening,
and actuating means shiftable in said housing between open and closed positions and including a manually actuable member shiftable in said housing, spring means interposed between said manually actuable member and said vent valve, and a limiting lost motion link accommodating limited movement of said vent valve relative to said manually actuable member, said limiting lost motion link including means for limiting the displacement of said manually actuable member with respect to said vent valve,
said pressure regulator valve being urged toward closed position in said regulator valve chamber in response to gas pressure at said inlet when said manually actuable member is inoperative,
said vent valve closing said vent opening and shifting said regulator valve to an open, pressure regulating position upon operation of said manually actuable member,
said spring means counteracting and limiting pressure-actuated movement of said regulator valve and vent valve when said manually actuable member is operated.

3. The assembly of claim 2 wherein the limiting lost motion link includes a pair of interlinked L-shaped hook members axially extending respectively from the manually actuable member and the vent valve.

4. The assembly of claim 3 wherein the spring surrounds and applies a predetermined axial extension force upon said interlinked L-shaped hook members to provide a predetermined bias force between the manually actuable member and the vent valve.

5. The valve assembly of claim 2 wherein said pressure regulator valve includes a plurality of flow channels for fluid flow past said regulator valve seal support member.

6. A device as defined in claim 2 wherein said vent valve is of larger size than said regulator valve and is subjected to gas pressure urging said regulator valve toward a decreased flow cross sectional area against said spring means when said regulator valve is opened by operation of said manually actuatable member.

7. A device as defined in claim 2 wherein said regulator valve chamber and said vent chamber are substantially aligned axially and said spring and manually actuable member are shiftable in a direction endwise of said vent valve.

* * * * *